(12) United States Patent
Jetelina et al.

(10) Patent No.: US 9,714,736 B1
(45) Date of Patent: Jul. 25, 2017

(54) APPARATUS FOR PROTECTING PVC RISERS

(71) Applicant: FLAGSHIP TECHNOLOGIES, INC., Nassau Bay, TX (US)

(72) Inventors: David Donald Jetelina, Nassau Bay, TX (US); Wynona Mae Jetelina, Houston, TX (US)

(73) Assignee: FLAGSHIP TECHNOLOGIES, INC., Nassau Bay, TX (US)

( * ) Notice: Subject to any disclaimer, the term of this patent is extended or adjusted under 35 U.S.C. 154(b) by 0 days.

(21) Appl. No.: 15/194,647

(22) Filed: Jun. 28, 2016

(51) Int. Cl.
*F16L 57/00* (2006.01)
*E03F 3/04* (2006.01)
*E03F 9/00* (2006.01)

(52) U.S. Cl.
CPC .............. *F16L 57/005* (2013.01); *E03F 3/04* (2013.01); *E03F 9/00* (2013.01)

(58) Field of Classification Search
CPC .................................. E03F 3/04; F16L 57/005
See application file for complete search history.

(56) References Cited

U.S. PATENT DOCUMENTS

| | | | | |
|---|---|---|---|---|
| 1,436,331 A * | 11/1922 | Ayling | .................... | E03C 1/122 138/89 |
| 3,802,466 A * | 4/1974 | Panella | ................. | F16L 55/115 138/89 |
| 3,805,826 A * | 4/1974 | Westerhoff | .............. | E03C 1/122 137/236.1 |
| 3,951,172 A * | 4/1976 | Flegel | ....................... | E03B 9/10 138/89 |
| 3,951,441 A * | 4/1976 | Scheuer | .................... | E03B 9/10 285/298 |
| 3,993,102 A * | 11/1976 | Polster | ................... | F16L 55/115 138/89 |
| 4,350,177 A | 9/1982 | Firchau et al. | | |
| 5,038,829 A * | 8/1991 | Panella | ................ | F16L 55/115 138/89 |
| 5,046,886 A | 9/1991 | Muir et al. | | |
| 5,063,996 A | 11/1991 | Kenner | | |
| 5,525,006 A | 6/1996 | Kilman et al. | | |
| 5,538,090 A | 7/1996 | Siler | | |
| 5,617,679 A | 4/1997 | Meyers | | |
| 5,769,565 A | 6/1998 | Martin, Jr. et al. | | |
| 7,025,529 B2 * | 4/2006 | Boudreau | ................. | E03F 5/06 404/25 |
| 8,844,559 B1 | 9/2014 | Dry | | |

(Continued)

OTHER PUBLICATIONS

Strand Associates, Inc., Report for Sanitation District No. 1 of Northern Kentucky, Oct. 2006, pp. 6, pp. 8-9, pp. 43 (tabel item #12), pp. 57 (table).

(Continued)

*Primary Examiner* — Ryan Reis
(74) *Attorney, Agent, or Firm* — Roa DeBoer Osterrieder, PLLC; Dileep P. Rao

(57) ABSTRACT

A protector for a plumbing cleanout having an exposed, protruding portion, the protector having a rigid element for use individually or in superimposed layers one upon another. The element has a circular center hole whose inside diameter is greater than the largest outside diameter of the exposed plumbing, parallel planar fundus and summa surfaces and at least one ferrous metal reinforcement member cast within the protector.

16 Claims, 5 Drawing Sheets

(56) References Cited

U.S. PATENT DOCUMENTS

| | | |
|---|---|---|
| 9,057,754 B2 | 6/2015 | Olsson et al. |
| 2010/0037969 A1* | 2/2010 | Fierst ................. F16L 1/11 |
| | | 138/89 |

OTHER PUBLICATIONS

Metropolitan Council, St. Paul, Minnesota, Inflow and Infiltration Sources Poster, 2015.

\* cited by examiner

APPARATUS FOR PROTECTING PVC RISERS

REFERENCES CITED

US Patent Documents

U.S. Pat. No. 5,769,565 June 1998 Martin et al. 404/25
U.S. Pat. No. 6,844,559 September 2014 Dry 137/377
U.S. Pat. No. 4,350,177 September 1982 Firchau et al. 137/370
U.S. Pat. No. 5,525,006 June 1996 Killman et al. 404/25
U.S. Pat. No. 5,063,996 November 1991 Kenner 166/75.1
U.S. Pat. No. 5,617,679 April 1997 Meyers 52/20
U.S. Pat. No. 5,046,886 September 1991 Muir et al 404/25
U.S. Pat. No. 5,538,090 July 1996 Siler 175/19
U.S. Pat. No. 9,057,754 July 2015 Olsson et al 1/1

Foreign Patent Documents

None

Non-Patent Citations

1 Strand Associates, Inc., Report for Sanitation District No. 1 of Northern Kentucky, October 2006, pp 6, pp 8-9, pp 43 (Table item #12), pp 57 Table.
2 Metropolitan Council, St. Paul, Minn., Inflow and Infiltration Sources poster, 2015

FIELD OF THE INVENTION

The present invention relates generally to plastic pipe risers. Specifically, the present invention relates to protection of sewer cleanouts from damage.

BACKGROUND OF THE INVENTION

Most sewer systems include one or more cleanout risers installed to enable quick and easy access for cleaning the sewer line for maintenance purposes. Modern sewer lines and fittings are most commonly constructed of PVC or ABS plastic. Sewer lines constructed of plastic offer many advantages over previously used materials; they are easy to install, cost effective, nontoxic and resistant to abrasion. However outdoor plastic cleanouts are subject to damage if struck by a mower blade, lawn tractor or other maintenance/road vehicle.

A large number of residential sewer cleanouts have been installed and placed into service without any mechanical protection whatsoever. Mechanical damage to unprotected sewer cleanouts is a significant cause of ingress and infiltration (I&I) into sewage treatment systems. Excess storm and groundwater entering the sewer system through I&I results in human health and environmental risk, robs the sewer system of its valuable capacity and puts a burden on operation and maintenance costs.

The vast majority of presently existing residential sewer cleanouts were installed without any protection from mechanical damage. Should an unprotected sewer cleanout be installed high relative to ground level the attached sewer system is susceptible to damage from passing vehicles. A cleanout mounted high relative to ground level also presents a trip hazard to passing pedestrians. Should an unprotected sewer cleanout be installed close to ground level there is susceptibility to damage from lawn maintenance equipment such as mowers, damage from passing vehicles being driven over the difficult to identify cleanout, as well as a susceptibility to the sewer cleanout becoming lost over time by virtue of being covered over by soil, gravel and grass.

One common method of protection for publicly accessible locations such as parking lots and sidewalks is to install a protective cast iron utility box over the plastic cleanout and then affix the cast iron utility box in place with a poured concrete slab reinforced with steel rebar. A brass or cast iron cover is affixed to the top of the cast iron utility box. However, cast iron utility boxes are expensive to purchase and their installation is time consuming and expensive requiring a significant amount of labor along with heavy equipment to install. Additionally access to the underground sewer system for maintenance requires a significant amount of labor to break apart the reinforced concrete slab and removal of the cast iron box.

Heretofore a variety of other approaches have been suggested for the protection of sewer cleanouts. One approach described in U.S. Pat. No. 8,844,559 to Dry discloses a method of protection consisting of a decorative fixture which provides visual notice of the cleanout. Unfortunately this method does not provide any mechanical protection for the cleanout. Dry's method is not applicable to a cleanout location near to driveways where moving vehicles are expected, is subject to damage from routine yard maintenance and other outdoor activities. Additionally this method is not suitable where such a method is aesthetically undesirable.

Another approach is that taken U.S. Pat. No. 5,769,565 to Martin et al. Martin recognized the importance of an improved cleanout protection device that incorporates a method of placing the sewer cleanout flush with the ground. While this strategy minimizes some exposure of the cleanout to damage from mower blades it suffers from several disadvantages. First, it is readily seen that the supporting skirt is composed entirely of thin ABS plastic which is easily distorted over time and may be exposed by any settling or erosion of the soil. Another disadvantage is that by virtue of being flush, the lawn and soil can be expected to readily conceal the device. Once lost the cleanout would be very difficult to locate in the event maintenance was needed to remove a sewer line clog. Yet another disadvantage is that vertical mechanical loading from heavy vehicles is supported by the underlying insubstantial plastic sewer lines and fittings.

BRIEF SUMMARY OF THE INVENTION

The present invention solves the problems described above and provides an apparatus for protecting sewer cleanouts from lawn mowers and other mechanically based lawn maintenance equipment. Similarly, the present invention protects the cleanout and underground sewer equipment from damage by vehicular traffic, is cost effective and requires a minimum amount of labor and skill to install. Additionally, the present invention provides reliable protection without the need to excavate or utilize heavy equipment for installation or sewer line maintenance purposes.

Additionally, the present invention substantially increases the ease of locating the cleanout in the event the cleanout is inadvertently covered over by gravel, soil and/or grass, and is easily removed for access to the underground sewer system for maintenance purposes. It is easily adjusted by unskilled labor to accommodate soil movement and subsidence, provides mechanical support and protection independent of the underground plumbing, and provides protection while providing aesthetic concealment or an enhanced visual warning of the sewer cleanout presence.

In one aspect, the present invention provides a protector for a plumbing cleanout having an exposed, protruding portion, the protector having a rigid element for use individually or in superimposed layers one upon another. The element has a circular center hole whose inside diameter is greater than the largest outside diameter of the exposed plumbing, and parallel planar fundus and summa surfaces and at least one ferrous metal reinforcement member cast within the protector.

In an embodiment, the surfaces have a circular outer perimeter. In an embodiment, the protector has a center hole of an inner diameter greater than 102% of the outside diameter of the exposed plumbing and less than 130% of the diameter of the exposed plumbing. In an embodiment, the outside diameter is greater than 1.5 times the center hole diameter and equal to or less than 4 times the center hole diameter. In an embodiment, the surfaces have an outer perimeter in the shape of a polygon. In an embodiment, the protector has a center hole of an inner diameter greater than 102% of the outside diameter of the exposed plumbing and less than 130% of the diameter of the exposed plumbing. In an embodiment, the maximum linear distance across the summa planar outside surface is greater than 1.5 times the center hole diameter and equal to or less than 4 times the center hole diameter.

Additional features and advantages of the present invention will become apparent to those skilled in the art upon reading the following detailed description, when considered in conjunction with the drawings.

DETAILED DESCRIPTION OF THE PREFERRED EMBODIMENT

Figure 1:
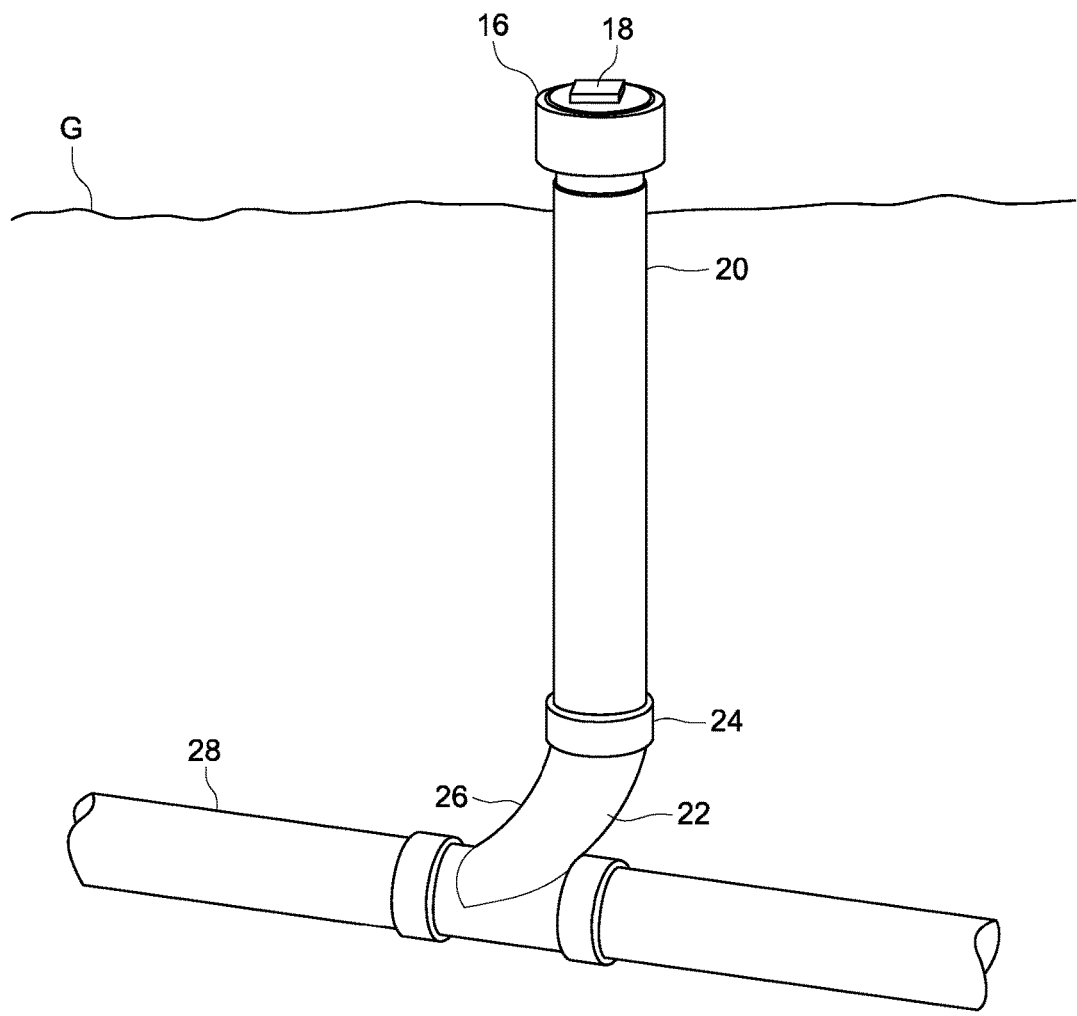
FIG. 1 is a perspective view of a typical sanitary sewer cleanout with no protection from mechanical damage.

FIG. 1 is illustrative via a perspective view of the relationship and the present state of the prior art of a sewer cleanout composed of plastic (PVC or ABS) lines and fittings. In a typical construction, a sewer line 28 runs from a dwelling unit or building to a municipal collection sewer line. Sewage typically travels under gravitational flow in such a situation and the sewer line 28 is normally positioned several feet below the surface of the ground G. A single sewer line 28 associated with a single dwelling unit or building frequently has more than one cleanout riser 20. A cleanout riser 20 is typically installed immediately adjacent to a dwelling unit or building, within every 100 feet along a sewer line 28, at each change of direction greater than 45 degrees in the sewer line 28 and at the juncture of the sewer line 28 and the municipal collection sewer line. The cleanout riser 20 allows access to the sewer line 28 in order to facilitate a number of important activities including insertion of video equipment for the inspection of sewer line 28, insertion of cleaning apparatus to remove blockages of the sewer line 28 and the insertion of testing plugs to effect a pressure test evaluation of sewer line 28. Additionally it is recognized that a cleanout riser 20 installed at the juncture of a municipal collection line will need to be accessed by municipal staff on a 24-hour basis to enable insertion of cleaning apparatus and video equipment for the benefit of the municipal collection sewer line.

In past practice the cleanout adapter 16 sometimes extends well above the surface of the ground G presenting a trip hazard to passing pedestrians. Also in installations of this style, should the elevated end of the cleanout riser 20 be struck by lawn tractor or passing vehicle, the resultant lateral motion of the elevated end of the riser cleanout 20 often times results in significant damage to the sanitary tee 22 and more particularly in damage to the upper connection of sanitary tee 24.

In past practice the cleanout adapter 16 sometimes is located in close proximity to the surface of the ground G where it is susceptible to impact damage from lawn maintenance equipment such as mowers. Also in installations of this style, should a passing vehicle such as an automobile or truck drive over the end of the riser cleanout 20 the resultant downward force and motion upon the cleanout adapter plug 16 often times results in significant damage to the sanitary tee 22 and more particularly in the damage to the upper connection of sanitary tee 24 and/or breakage of the upper neck of sanitary tee 26.

Figure 2:
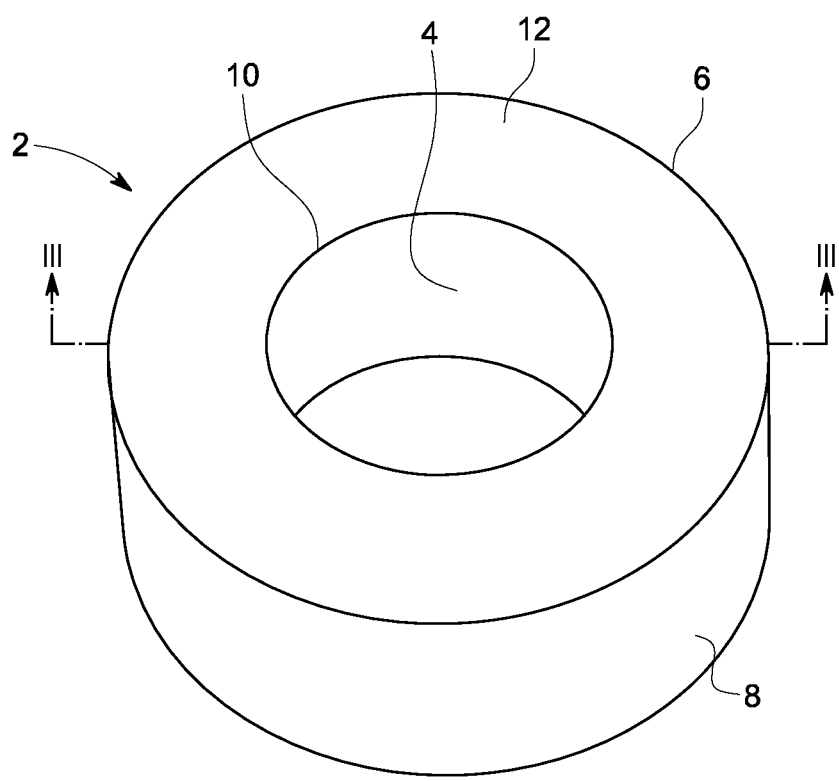
FIG. 2 is a perspective view of one embodiment of the protector in accordance with the present invention.

Referring to the drawings and to FIG. 2 in particular there is shown one embodiment of the protector 2. The protector 2 may be in the shape of a rectangle-section toroid and could be formed of steel reinforced concrete or the like, having a center hole of protector 4 and an inner radius 10 of protector sized to be sufficiently large such that the cleanout adapter 16 may pass with close proximity during protector 2 installation over cleanout adapter 16. Protector 2 has an outer perimeter 6 sized to create the desired area of surface of protector perpendicular to center hole 12, this surface being planar and matching top and bottom. The thickness of the protector 8 ranges from 2 to 6 inches depending on the installation application. The shape of the outer perimeter of protector 6 may be in the form of a circle, square, rectangle or polygon.

The diameter of the center hole of protector 4 is sized in accordance with the outside diameter of the cleanout adaptor 16 which will pass thru the center hole of protector 4. There must be sufficient clearance to install/remove protector 2 over cleanout adaptor 16 in the presence of soil, sand, mud, shells, pebbles and small rocks. To provide optimum protection of the cleanout riser 20 and attached plumbing, the inner radius 10 of protector 2 should be sized in consideration of the outside diameter of the cleanout adapter 16. Depending on installation demands, the inner radius of protector 10 may range from 102% to 150% of the outside diameter of cleanout adaptor 16, with 105% to 115% being found to be the most effective.

Figure 3:
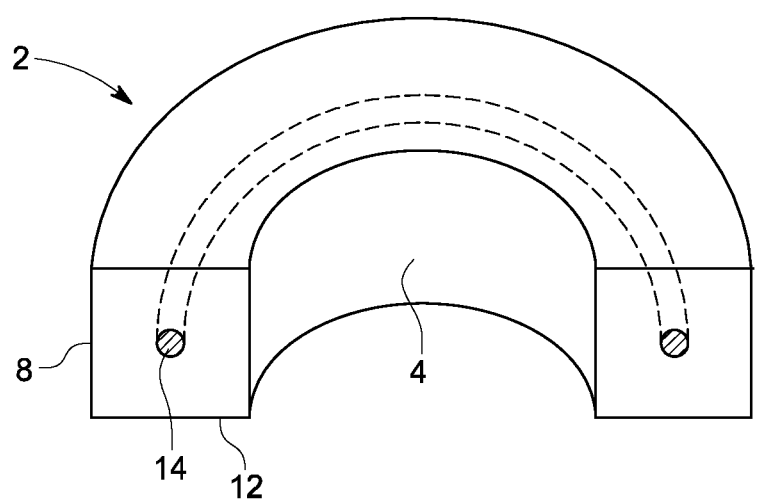
FIG. 3 is a section taken substantially along lines III-III of FIG. 2 in the direction of the arrows.

FIG. 3. is a section taken substantially along lines III-III of FIG. 2 in the direction of the arrows. Shown is one embodiment of protector 2 composed of concrete in conjunction with a ferrous reinforcement ring 14. Reinforcement of protector 2 is important to ensure against breakage of protector 2 by vehicular traffic. Use of a ferrous reinforcement ring 14 or other ferrous elements allow detection and location of the otherwise all plastic cleanout riser 20 via common electronic means such as a metal detector. It is recognized that a wide variety of different materials may be utilized to construct the body of protector 2, such as steel reinforced concrete, fiber reinforced concrete, fiberglass, hard rubber and plastic.

Figure 4:
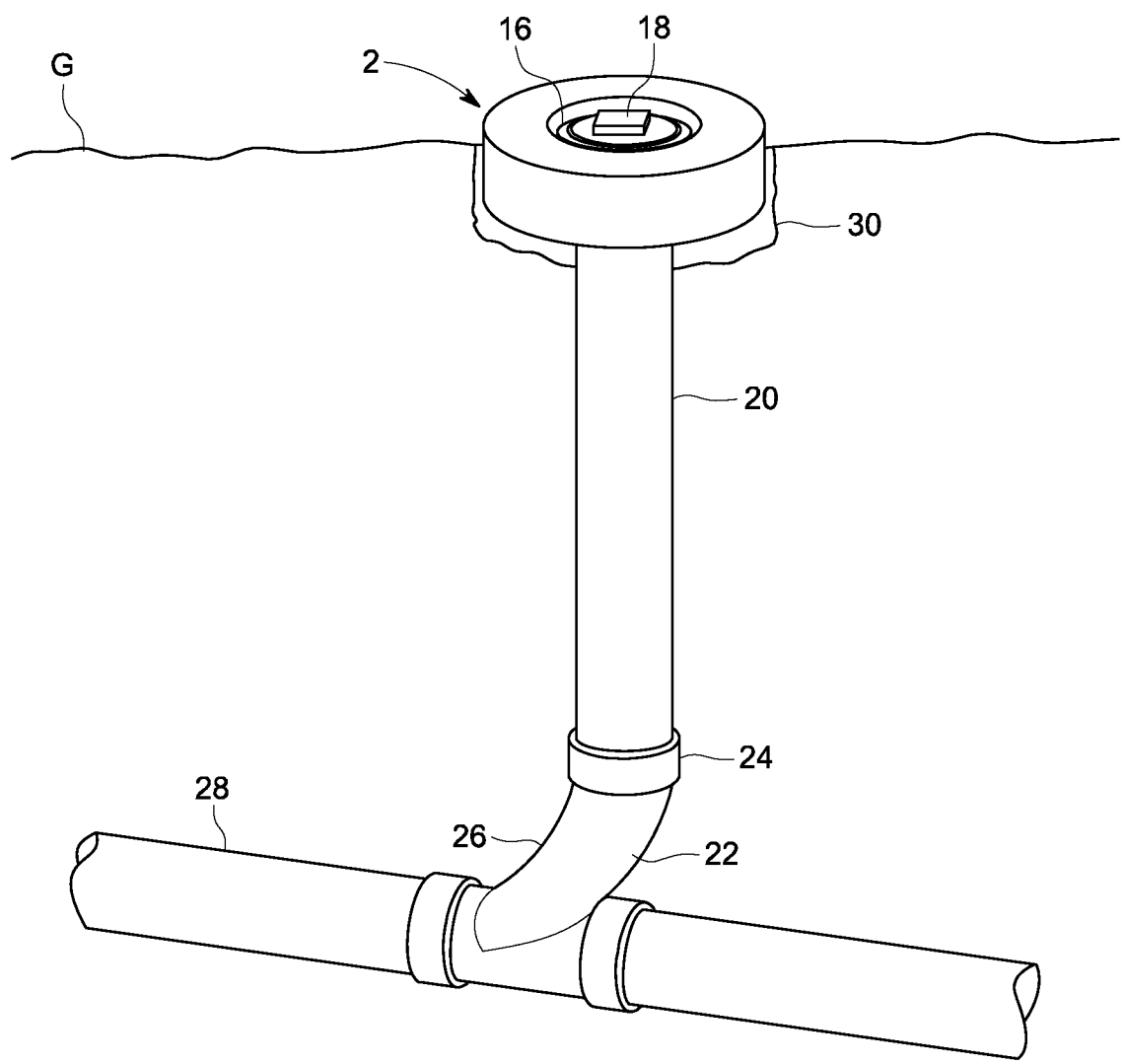
FIG. 4 is a perspective view of one embodiment of a single protector installed over a typical sanitary sewer cleanout.

FIG. 4 is a drawing of a single protector 2 installed for protection of cleanout riser 20 and associated lines and fittings. Installations of this type are applicable for firm soil or soil containing gravel and rocks. The protector 2 is installed in the field by first excavating by hand tools a hole 30 in the ground G slightly larger than the outer perimeter 6 of protector 2. The hole 30 should be dug to a depth such that the upper surface of protector perpendicular to center hole 12 will be above the top of the cleanout adapter plug 18 when the protector 2 is placed over cleanout adapter 16. Protector 2 is then placed over cleanout 16 completing the installation.

Figure 5:
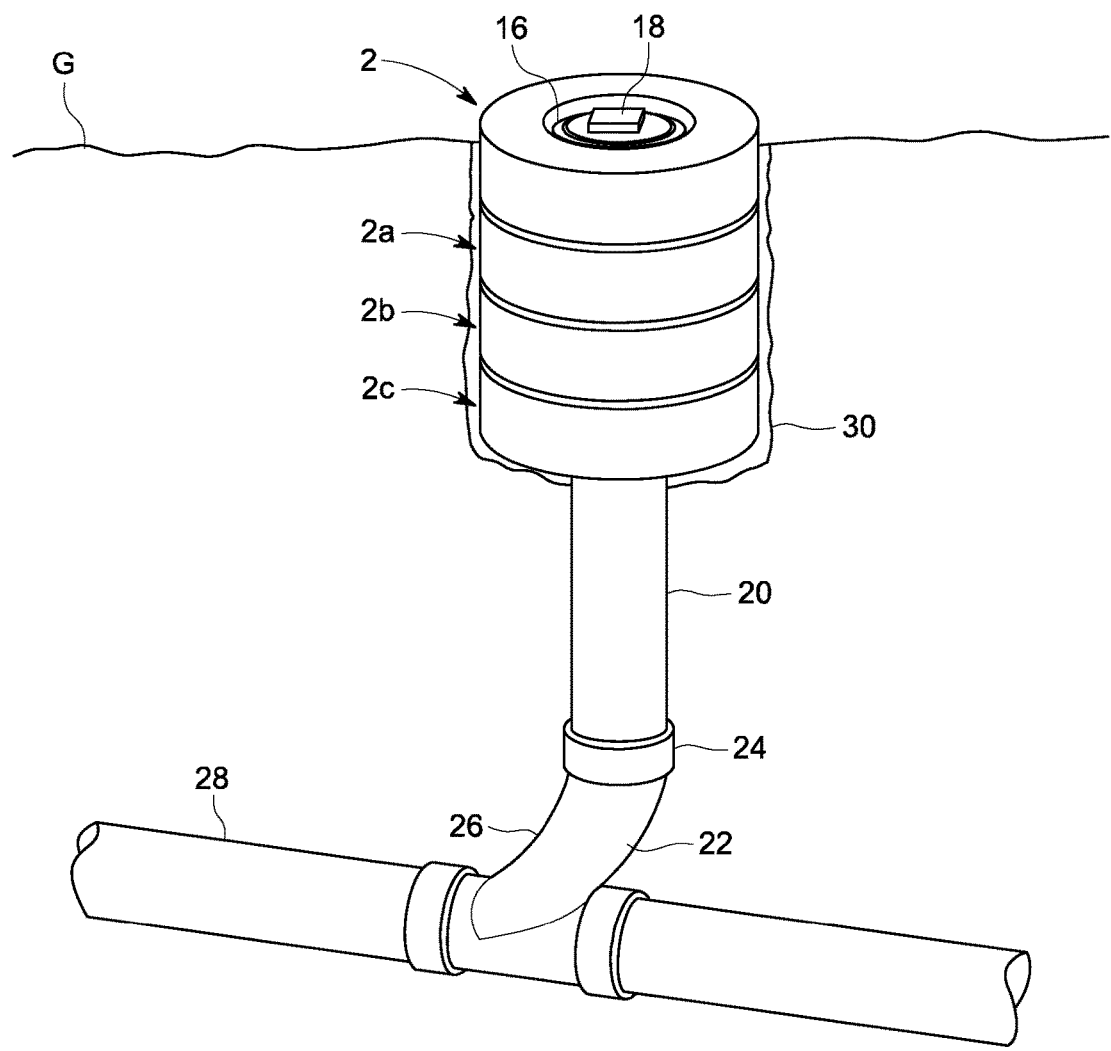
FIG. 5 is a perspective view of one embodiment of a plurality of protectors installed over a typical sanitary sewer cleanout.

FIG. 5 is a drawing of a plurality of protectors 2 installed for protection of cleanout riser 20 and associated lines and fittings. Installations of this type are applicable for sandy or loamy soil. The first protector 2c is installed in the field by first excavating by hand tools a hole in the ground G slightly larger than the outer perimeter 6 of protector 2c. The hole 30 should be dug to a depth such that the upper surface of protector perpendicular to center hole 12 belonging to protector 2 will be above the top of the cleanout adapter plug 18 when protectors 2c, 2b, 2a and 2 are placed over cleanout adapter 16. Protector 2c, 2b, 2a and 2 are then placed over cleanout 16 completing the installation.

Accordingly the reader will see that the protector in its various embodiments can be used to provide a high-level of mechanical protection for sewer cleanouts which can be easily and conveniently installed, can be removed just as easily and without damage, modification of or opening up the underground piping and fittings connecting to an active sewer line. In addition the protector is seen to be very durable with a long service life.

Furthermore the invention has the additional advantages in that:

Protector can be rapidly located via mechanical means such as a soil probe type utility locator or shovel due to protector's upper planar surface being severalfold larger than the surface area of a cleanout adapter plug. Protector can also be easily located via electronic means due to the presence of a ferrous reinforcement ring.

The stackable design of the protector accommodates a wide variety of soil types and various installation demands/environments.

Movement of the installed protector is independent of the protected plastic riser. The load bearing surface area provides reliable support and protection even in loamy unconsolidated soils. The protector also inhibits lateral movement of the protected plastic riser, while remaining wholly independent of the riser in regard to vertical movement.

The protector may be constructed in a range of colors/patterns to provide a more aesthetic appearance such as green for lawn applications, tan pattern for desert locations or colors such as bright orange for use in areas where it is desirable to easily see cleanout location.

The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A protector for a plumbing cleanout having an exposed, protruding portion, the protector comprising: rigid element having a center hole, wherein a center hole diameter is greater than a largest outside diameter of the exposed, protruding portion of the plumbing cleanout, the rigid element having parallel planar fundus and summa surfaces, wherein the rigid element comprises at least one ferrous metal reinforcement member cast within the rigid element.

2. The protector of claim 1, wherein the summa surfaces have a circular outer perimeter.

3. The protector of claim 2, wherein the protector has the center hole of an inner diameter greater than 102% of the largest outside diameter of the exposed, protruding portion of the plumbing cleanout and less than 130% of the largest outside diameter of the exposed, protruding portion of the plumbing cleanout.

4. The protector of claim 2, wherein the outside diameter of the rigid element is greater than 1.5 times the center hole diameter and equal to or less than 4 times the center hole diameter.

5. The protector of claim 1, wherein the summa surfaces have a polygonal outer perimeter.

6. The protector of claim 5, wherein the protector has the center hole of an inner diameter greater than 102% of the largest outside diameter of the exposed, protruding portion of the plumbing cleanout and less than 130% of the largest outside diameter of the exposed, protruding portion of the plumbing cleanout.

7. The protector of claim 5, wherein a maximum linear distance across a summa planar outside surface of the rigid element is greater than 1.5 times the center hole diameter and equal to or less than 4 times the center hole diameter.

8. The protector of claim 1, wherein the rigid element is configured for directly stacking on top of one or more rigid elements.

9. The protector of claim 1, wherein the rigid element comprises a detectable rigid element.

10. The protector of claim 9, wherein the detectable rigid element is electronically detectable, mechanically detectable, or both.

11. The protector of claim 1, wherein the center hole is circular.

12. The protector of claim 1, wherein an outer perimeter shape of the rigid element comprises a circle, a square, a rectangle, or a polygon.

13. The protector of claim 1, wherein the rigid element comprises one or more colors, patterns, or both.

14. The protector of claim 1, wherein the rigid element comprises one or more materials comprising: concrete, fiberglass, hard rubber, plastic, steel, or combinations thereof.

15. The protector of claim 1, wherein an inner surface of the rigid element is smooth.

16. The protector of claim 1, wherein movement of the protector is independent of the exposed, protruding portion of the plumbing cleanout.

* * * * *